United States Patent
Hanechak et al.

(10) Patent No.: US 7,983,964 B2
(45) Date of Patent: *Jul. 19, 2011

(54) RELATED PRODUCT SYSTEM AND METHOD

(75) Inventors: Brian D. Hanechak, Waltham, MA (US); Robert L. Dulaney, Paxton, MA (US)

(73) Assignee: VistaPrint Technologies Limited, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,485

(22) Filed: Apr. 13, 2009

(65) Prior Publication Data

US 2009/0198571 A1   Aug. 6, 2009

Related U.S. Application Data

(63) Continuation of application No. 11/056,305, filed on Feb. 11, 2005, now Pat. No. 7,519,548.

(51) Int. Cl.
    *G06F 17/30* (2006.01)
(52) U.S. Cl. ............ 705/27.2; 705/26.1; 705/26.5; 705/26.7; 705/27.1
(58) Field of Classification Search .......... 705/26, 705/27
    See application file for complete search history.

(56) References Cited

U.S. PATENT DOCUMENTS

| | | | |
|---|---|---|---|
| 4,945,219 A * | 7/1990 | Tanaka | 235/488 |
| 5,930,811 A | 7/1999 | Nojima et al. | |
| 7,062,454 B1 * | 6/2006 | Giannini et al. | 705/26.81 |
| 7,177,484 B2 * | 2/2007 | Fredlund et al. | 382/284 |
| 7,216,092 B1 | 5/2007 | Weber et al. | |
| 7,283,981 B2 * | 10/2007 | Solem | 705/42 |
| 7,490,057 B2 | 2/2009 | Connolly et al. | |
| 7,607,084 B2 | 10/2009 | Malone et al. | |
| 2002/0023001 A1 * | 2/2002 | McFarlin et al. | 705/14 |
| 2002/0026359 A1 | 2/2002 | Long et al. | |
| 2002/0082919 A1 * | 6/2002 | Landau et al. | 705/14 |
| 2003/0023490 A1 | 1/2003 | Lenyon et al. | |
| 2003/0154325 A1 * | 8/2003 | Castle | 710/1 |
| 2003/0208556 A1 | 11/2003 | Friedman et al. | |
| 2004/0215479 A1 | 10/2004 | Dorsey et al. | |
| 2005/0075746 A1 | 4/2005 | Malone et al. | |
| 2005/0102151 A1 | 5/2005 | Fuwa et al. | |
| 2006/0184418 A1 | 8/2006 | Connolly et al. | |
| 2006/0184424 A1 | 8/2006 | Connolly et al. | |
| 2009/0138364 A1 | 5/2009 | Connolly et al. | |

OTHER PUBLICATIONS

PRN: "Indigo and MediaFlex.com unveil web-driven variable data digital printing at DRUPA 2000," PR Newswire, May 16, 2000, Dialog file 621 #02513669, 3pgs.*
U.S. Appl. No. 10/679,028, File Wrapper History.
U.S. Appl. No. 12/557,257, File Wrapper History.
U.S. Appl. No. 11/082,543, File Wrapper History.
U.S. Appl. No. 12/364,655, File Wrapper History.
U.S. Appl. No. 11/056,304, File Wrapper History.
U.S. Appl. No. 11/056,305, File Wrapper History.

* cited by examiner

*Primary Examiner* — Robert M. Pond
(74) *Attorney, Agent, or Firm* — Jessica J. Costa

(57) ABSTRACT

Computer-implemented systems and methods for automatically creating a second customized product design incorporating information from a first customized product design. Information from a first custom product design is automatically combined with additional automatically selected content to create a new custom product to be promoted to the customer. When possible, information known about the customer, such as the customer's geographic location or business interests, is used to select the additional content for incorporation into the design.

59 Claims, 3 Drawing Sheets

RELATED PRODUCT SYSTEM AND METHOD

REFERENCE TO PRIOR APPLICATION

This application is a divisional of prior application Ser. No. 11/056,305, filed on Feb. 11, 2005, which is hereby incorporated by reference in its entirety.

FIELD OF THE INVENTION

The present invention relates to electronic custom product design and more particularly to automatically created custom products.

BACKGROUND

Business cards are widely used promotion and marketing tools. While business cards are quite useful, the recipient of the card often quickly, and sometimes haphazardly, places the card in a wallet, purse, briefcase, desk drawer, file folder, or other location where the card may be difficult to locate in the future and rarely or never seen. Many cards are simply lost, forgotten, or discarded.

Some business people, professionals, and others who desire to keep their name and contact information in front of their clients and prospective clients find it productive to combine their contact and marketing information with additional material that the recipient may want to refer to on an ongoing basis and, therefore, will keep close at hand for frequenting viewing. Two of the most common examples of additional material often seen combined with promotional information about a business are calendars and season schedules for local sports teams. Many businesses may not use these types of materials because they are too busy or distracted to engage in the traditional design and ordering process or they simply forget to order the materials on a timely basis.

There is, therefore, a need for a novel system and method for automatically creating and presenting a supplemental product design that incorporates the business card design or other relevant information of the customer into the design of another product together with additional product content automatically selected based on information associated with that customer.

SUMMARY

The present invention is directed at satisfying the need for systems and methods that automatically create the design for a supplement product based on an existing customized product and including additional automatically selected content.

In accordance with one aspect of the invention, the design of a second custom product is automatically created by combining the design information of a first custom product with informational content automatically selected from a plurality of available informational contents. If possible, the information content incorporated into the design of the second product is selected based on geographical, occupational, or other factor as determined from the design and content of the first product.

DESCRIPTION

Figure 1:
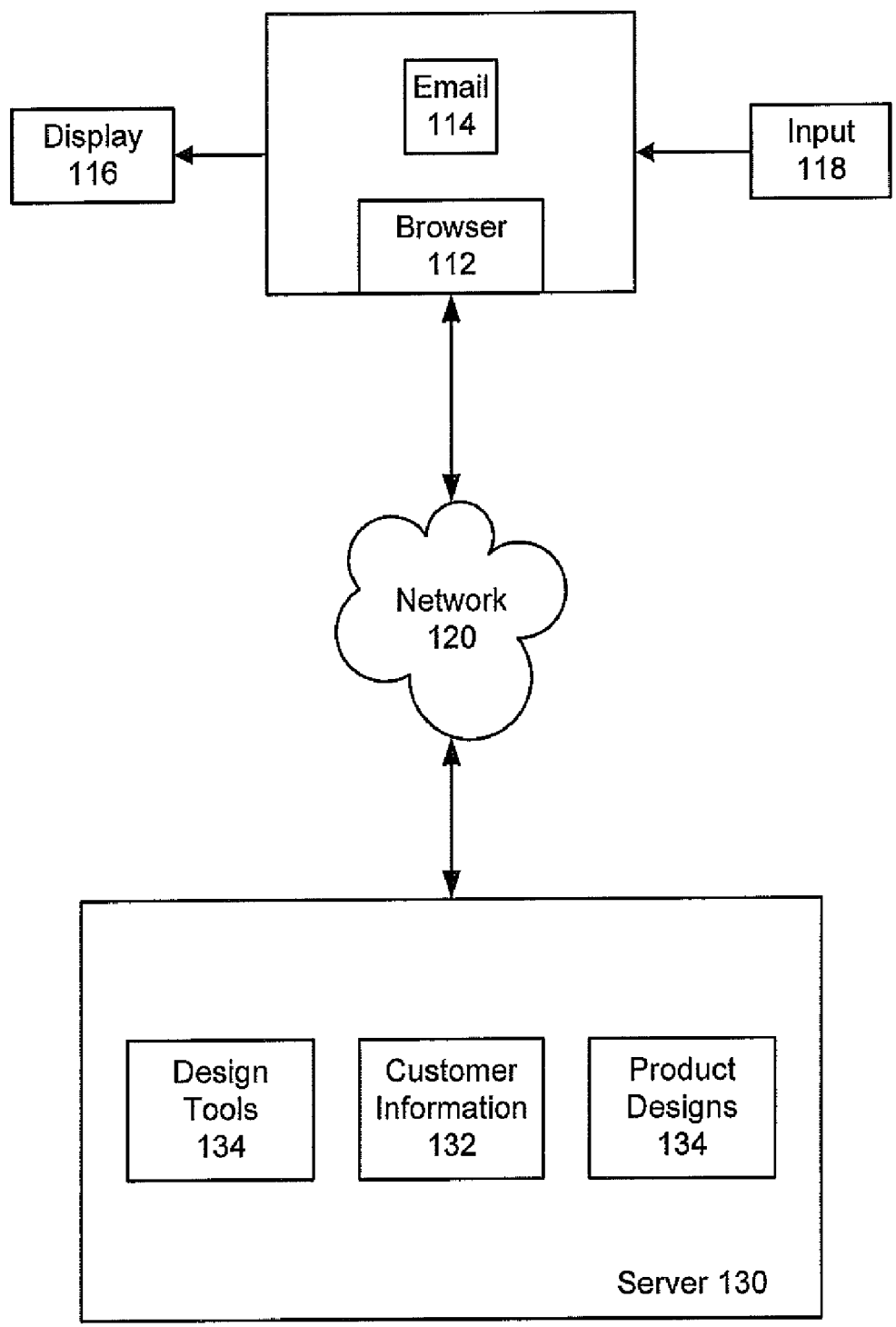
FIG. 1 is a schematic representation of a system with which the invention can be employed.

Referring to FIG. 1, client 110 is a typically equipped personal computer, portable computer, or other system capable of communicating via network 120, such as the Web, with remote server systems, such as server 130, and capable of executing a web browser program 112 and an email program 114. The client 110 system also includes a user display 116 capable of displaying text, images, and graphics to a user of the system and one or more user data input devices 118, such as a keyboard and a mouse.

Server 130 is the web site computing and support system of a vendor of customized products. In the following discussion, a vendor site that allows users of the site to design and purchase personalized printed products using online software tools available at the site, such as VistaPrint.com operated by VistaPrint Limited, will be discussed, but it will be understood that the invention is not so limited. While server 130 is depicted in FIG. 1 as a single block, it will be understood that server 130 will typically be comprised of multiple servers, data storage systems, and other equipment and devices configured to communicate and operate cooperatively to support the operations of the site.

Server 130 provides the user of client 110 with the ability to access the product provider's site, view product templates, and use software product design tools 136 provided by the site to select a template, add images, text, or other content, and perform various modifications to create a customized product design. After a product has been designed by the user, the user can place an order for the production and delivery to the user's home or business of quantities of high quality, printed products of the type that the user is not capable of producing with the printer systems typically connected to most personal computer systems.

Server 130 retains customer information 132 and product designs 134. It will be understood that these are conceptual representatives of one possible system embodiment and the contents of customer information 132 and product designs 134 could be stored in various locations on multiple storage systems.

In the disclosed exemplary embodiment, product designs 134 contains the various pre-designed images, layouts, graphics, color schemes, and other content and materials provided for use by site users in preparing custom products. These various elements are retained such that they can be individually selected and combined with the text or other content provided by the user to create a personalized electronic product design. As will be discussed in more detail below, among the pre-designed content elements prepared by the vendor and stored in product designs 134 are a number of content images that are associated by the product vendor with one or more search criteria.

Product designs 134 also retains the custom product designs created by customers. The customer designs are retained as separately stored component elements, such as text, layouts, images, graphics, fonts, and organizational and relational information that collectively comprise the product description necessary to allow product components in product design information 134 to be identified, retrieved, and assembled to create a customer's personalized product. Electronic product design systems allowing a user to create a personalized electronic product design using separately stored layouts, images, and other component elements are described in co-owned and co-pending application Ser. Nos. 10/449,836, entitled Electronic Document Modification, and 10/646,554, entitled Automated Image Resizing and Cropping, which are hereby incorporated herein by reference.

Customer information 132 contains the data stored by the vendor in connection with each customer design retained in product designs 134. Each custom product design is associated with a unique product design identifier as well as other related information, such as the product type, quantity ordered, date shipped, shipping address, billing address, the customer's account identifier, and so forth.

Figure 2:
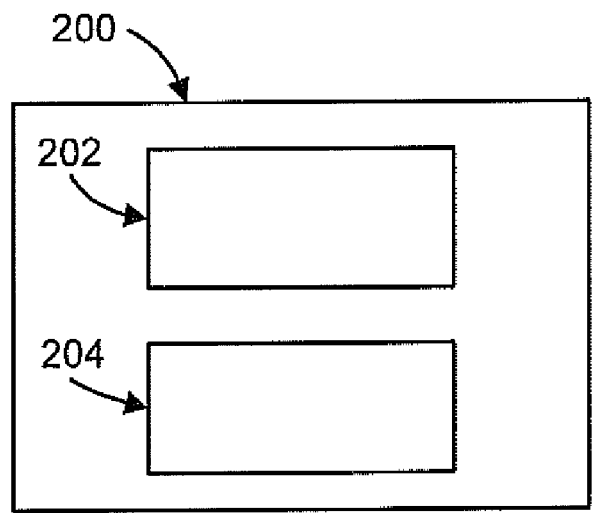
FIG. 2 is a simplified depiction of an embodiment of a related product.

Referring to FIG. 2, a simplified depiction of an automatically prepared custom related product design 200 will be discussed. In the simple form shown, related product 200 can be considered to have two content areas, first product design information area 202 and targeted content area 204. The relative size and position of areas 202 and 204 within product design 200 can be established by the product vendor as desired for aesthetic or practical reasons. While areas 202 and 204 are shown in FIG. 2 as two separate and non-overlapping areas, it will be understood that the two areas could abut each other, or one area could overlap or overlay the other. For example, area 204 could be designed as a background image covering the entire design 200 with the first product design information area 202 being positioned on top of area 204.

First product area 202 contains information previously designed or provided by the customer. For example, area 202 could be an image of the customer's previously designed business card or other previously designed product. As an alternative embodiment, instead of incorporating a faithful depiction of the business card design in related product 200, the product vendor could use the name, address, telephone number, and other contact information retained in product design 134 and associated with the customer's business card or other design and incorporate the customer information into related product design 200 in a different size, arrangement, font, color, background, or with other modifications that the vendor believes would be aesthetically pleasing in the overall related product design 200.

Targeted content 204 is selected automatically from a plurality of available content images based on available information about the customer's occupation, geographical location, or other identifiable customer preference and, where appropriate, also based on the time of year when the customized related product design is being offered to the customer. By way of illustration of one embodiment, the vendor has prepared and stored in product designs 134 the season schedules for various professional sports, such as professional baseball, football, basketball, soccer, hockey, auto racing, and so forth. Each schedule is associated in product designs 134 with one or more geographical identifiers, such as zip or postal codes, related to the geographical region where fans of that team are most likely to be located.

The process for placing an order for the first product requires the customer to specify certain geographical information, such as a shipping address to which the printed products are to be shipped. In addition, a business card design itself typically contains address information. Therefore, it is very likely that information is available in customer information 132 from which postal code information about the customer can be obtained.

In addition to the physical location of the customer, the time of year is also considered in selecting the targeted content most likely to be desirable to the customer. While a season schedule for the local baseball team might be an attractive content item if the related product is being offered to the customer in the early spring, the schedule for the local football team would be a better choice for incorporation into the product design as targeted content 204 if the product is being promoted in the early autumn.

As another example of providing content that is of ongoing value to the clients of the customer, the image to be incorporated into the related product as targeted content 204 could be based on available occupational information about the customer. To assist customers to quickly locate an attractive and relevant design for a business card or other product, the product vendor provides optional means, such as a drop down menu or a list of individual buttons, that allows the customer to request that the customer be presented with candidate product templates relevant to the customer's particular type of business, such as construction, legal, medical, real estate, and so forth. Server 130 can retain in customer information 132 an indication of the type of business search that was used and can use that indication to select a candidate content image for targeted content 204. For example, if the customer searched in the category of health and fitness, an image with tips on exercise and diet could be selected for use as content image 204. If the selected category was real estate, an image containing advice on buying or selling a home could be chosen as image 204.

Some customers may have designed one or more additional customized products that are retained at server 130 and are associated with that customer's account identifier. As another means of selecting content of interest to the customer for use in targeted content area 204, the vendor could search all other customized product designs associated with that customer's account to identify any products previously designed by that customer that contain targeted content. If earlier used targeted content is identified, indicating that the customer was interested in that type of content in the past, an image of similar or corresponding targeted content suitable for use in related product design 200 can be incorporated into design 200.

Related product 200 may be presented and promoted to a customer in various ways, FIG. 3 will now be discussed in various contexts to illustrate representative ways of presenting and marketing related product 200 to a customer.

Figure 3:
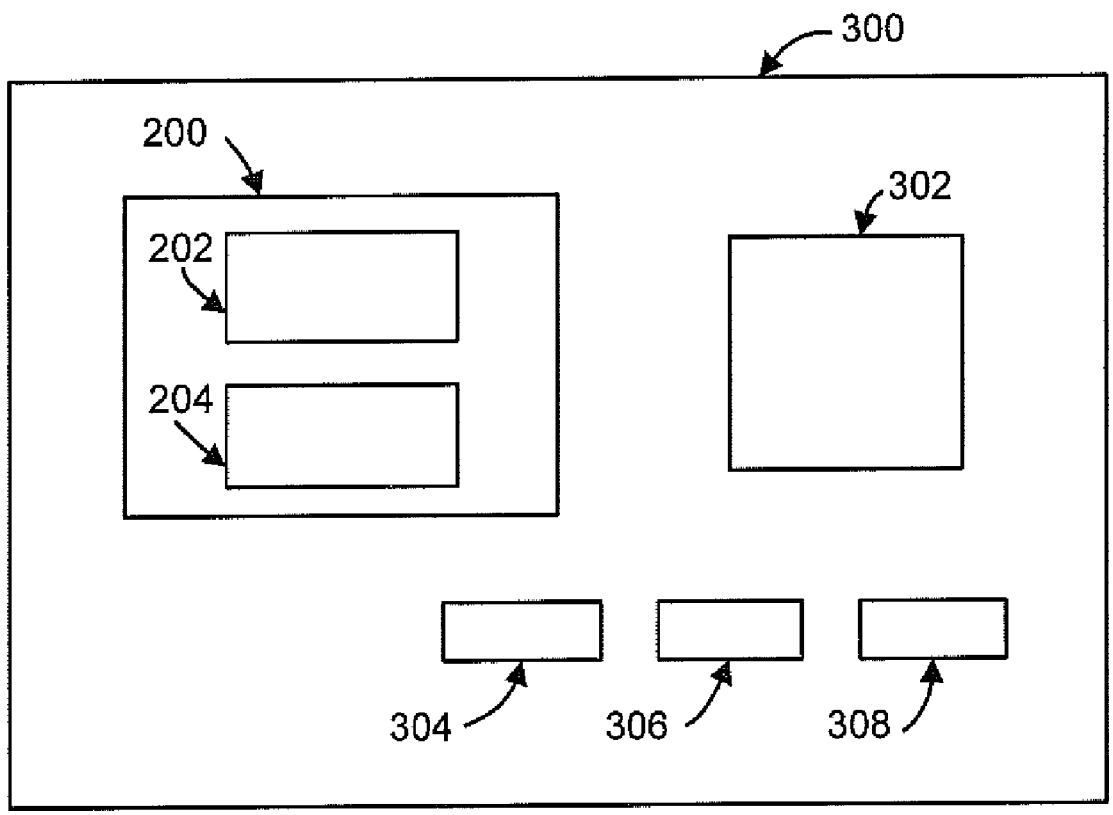
FIG. 3 is a simplified representation of a promotional presentation of the related product.

In the context of an email marketing campaign, FIG. 3 can be discussed as representing a promotional email message prepared by the product vendor. The product vendor could search product designs 134 to identify a previously stored business card design, combine the business card image with a selected targeted content image 204 to create an image of related product 200, and send email 300 containing the related customized product image 200 to the customer using the email address associated with that customer in customer information 132. Email 300 would typically include one or more areas of text and graphics, represented collectively as message content area 302. Email 300 also includes active link 304 allowing allow the customer to initiate the purchase process for the promoted product and active link 306 allowing the customer to initiate a product edit process to select a new content image 204 make other desired changes prior to ordering the product.

In the context of a post-sell offer on the Web site, FIG. 3 can be discussed as representing a post-sell Web page displayed during the customer check-out process to a customer who accessed server 130, designed a personalized business card or other product, and is in the process of completing the usual purchase process by specifying method of payment, shipping address and so forth. Just prior to final execution of the order, the vendor displays post-sell page 300 to the user. As in the above-described email promotion situation, the page displays the automatically generated design 200 along with additional text and graphics 302 relative to the offer. To facilitate and streamline the ordering process, post-sell page 300 presents link 304 allowing the customer to add the related product to the customer's order, link 306 allowing the customer to proceed with the original order without purchasing the related product, and link 308, allowing the customer to initiate an edit session for the related product to select a different content image 204 or perform other desired actions. If the customer is in the process of purchasing a business card, the image of the business card being purchased in used in related product image 200 as image 202. If the product being currently being purchased is not a business card, but an earlier created business card design is associated with the customer in product designs 132, the associated business card design is retrieved and used as image 202. If the customer has more than one business card design stored in product designs 132, In the context of a specific customer request, FIG. 3 can be discussed as representing a related product Web page requested by the customer. While the customer is in the process of completing the purchase process for a business card design, the product vendor displays a link bearing a legend such as "See related products" or the like. If the customer selects this link, server will display related product page 300. As with the post-sell page described above, to facilitate and streamline the ordering process, related product page 300 presents link 304 allowing the customer to add the related product to the customer's order, link 306 allowing the customer to proceed with the original order without purchasing the related product and link 308, allowing the customer to initiate an edit session for the related product to select a different content image 204 or perform other desired actions. Also similar to the post-sell situation, if the customer is in the process of purchasing a business card, the image of the business card being purchased in used in related product image 200 as image 202. To facilitate and streamline the ordering process, related products page 300 presents link 304 allowing the customer to add the related product to the customer's order, ling 306 allowing the customer to proceed with the original order without purchasing the related product, and link 308, allowing the customer to initiate an edit session for the related product to select a different content image 204 or perform other desired actions. If the product being currently being purchased is not a business card, but an earlier created business card design is associated with the customer in product designs 132, the associated business card design is retrieved and used as image 202. If the customer has more than one business card design in product designs 132, one design will be selected, typically the most recent, and presented in image 200 with a link 304 presented to allow the customer to request to see additional related product images 200 for the additional business card designs.

If for some reason no useable geographic or occupational information is available for a particular customer, a default backup image 204 is used. In the disclosed embodiment, the default image is a calendar, but other content could be used.

Figure 4:
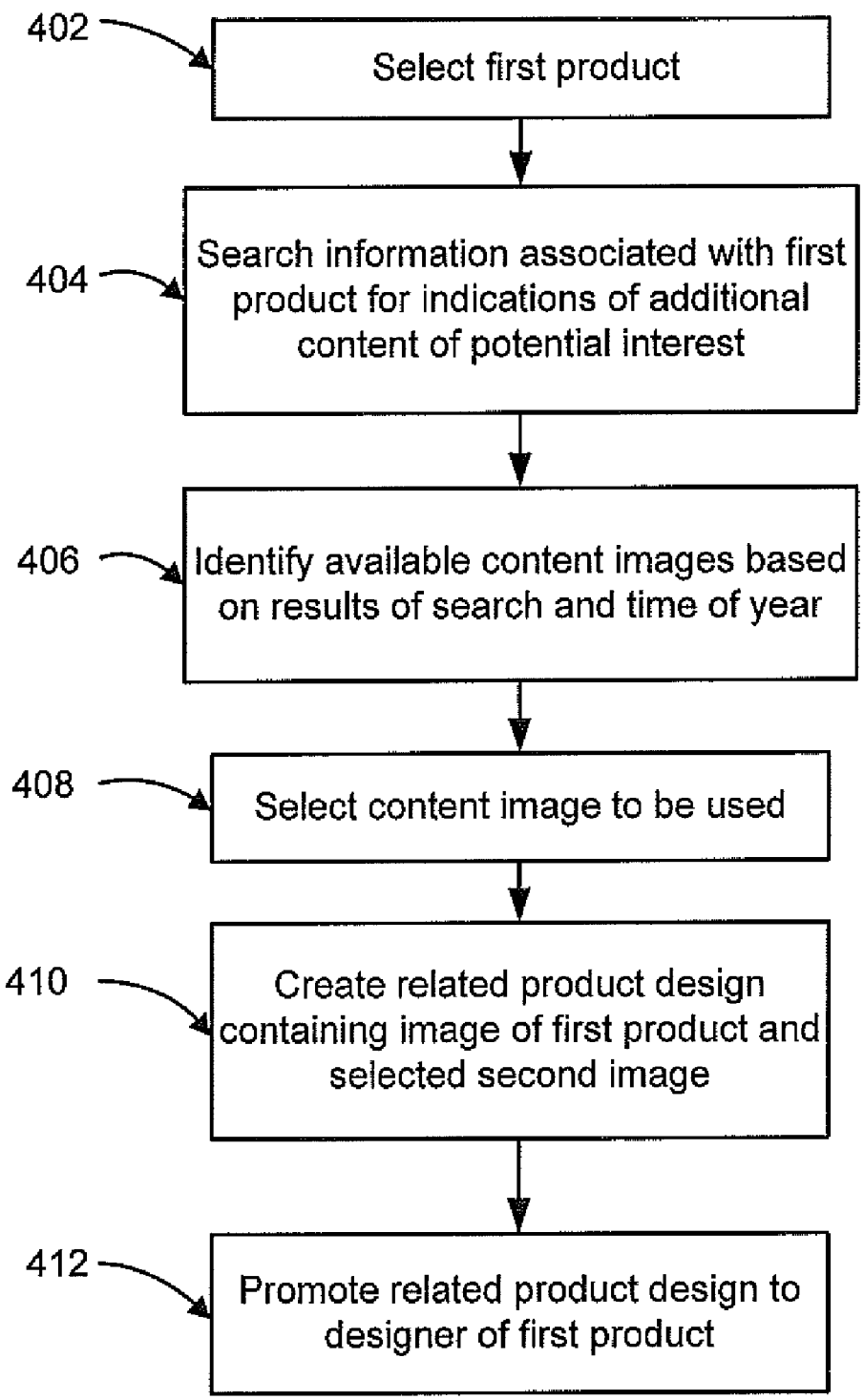
FIG. 4 is a flow chart showing a representative method for creating a new product that is related to a previously designed product.

Referring now to FIG. 4, a representative embodiment of a method for creating related product designs in accordance with the invention will be discussed. At step 402, information about a first product design suitable for incorporation into a second related product design is identified and selected for incorporation into the related product design 200. Business card designs containing relevant contact information are a logical choice for use in creating related products, but it will be understood that the invention is not limited to use with just product design images or information extracted from a product design. A logo, photograph, or other information or image provided by a customer and available at server 130 could be employed.

Each customized product design retained in product designs 134 is associated with a particular customer account. To create a user account and order products from server 130, a customer must provide various contact information, such as a name, shipping address, telephone number, email address, and the like, which is retained in customer information 132. Any product designs created by the customer are associated with a user account, allowing the custom designs in product designs 134 to be associated with the customer's information in customer information 132. Information about the customer's design process when creating a custom product, such whether the customer searched for products by specific industry, may also be retained.

At step 404, available customer information is searched to locate a customer postal code or other information in customer information 132 that can be used to select a targeted content image from customer information 132 for incorporation as image 204 into related product design 200. At step 406, targeted content images matching the results of the search in step 404 are identified. As discussed above, the product vendor will typically take the current time of year into consideration in the search process to avoid presenting an undesirable option, such as a product incorporating a team schedule near the end of that team's season. At step 408, if more than one image meets the search criteria, the vendor will select among the available options in any manner considered desirable by the vendor, such as by opting to use whichever of the identified images has proven to be most popular with the vendor's customers. If no suitable targeted content image is identified, a default content image, such as a calendar, is used.

At step 410, the related product image 200 is created containing the image of, or information from, the first product design and the selected content image. Additional content such as borders and background color or images may also be included in the image 200 design. As discussed above in connection with FIG. 3, the related product image can be promoted to the customer in various ways, such as in response to the customer's request to see related products, as a post-sell promotion when the customer is in the process of ordering the first product, or, in a personalized email containing the image of the related product.

While an exemplary embodiment of the invention has been discussed, the described embodiment is to be considered as illustrative rather than restrictive. The scope of the invention is as indicated in the following claims and all equivalent methods and systems.

What is claimed is:

1. A method implemented on a computer system comprising one or more computers for automatically creating a design for a second customized product for a customer, the second customized product design being related to an earlier-created design of a first customized product associated with the customer, the method comprising:
    retaining the first customized product design and a customer account containing customer information and product information associated with the first customized product design in electronic form;
    retaining a plurality of content images in electronic form, one or more of which are associated with one or more search criteria;
    retaining an uncustomized design for a second product in electronic form, the uncustomized design having at least a first content area for content retrieved from the first customized product design and a second content area for an image retrieved from the plurality of content images retained in electronic form;

automatically retrieving information from the first customized product design and inserting the retrieved information into the first content area;

analyzing by the computer system the customer account information associated with the first customized product design to determine one or more search criteria for selecting a content image from the plurality of content images; and automatically selecting a content image from the plurality of content images based on the determined one or more search criteria and inserting the selected content image into the second content area such that a second product design customized for the customer is automatically created without requiring the customer to design the second product design.

2. The method of claim 1 wherein the retrieved information inserted into the first content area is an image of the first customized product.

3. The method of claim 1 wherein the retrieved information inserted into the first content area is information taken from the design of the first customized product.

4. The method of claim 1 wherein the determined one or more search criteria is extracted from information contained in the customer account information associated with the first customized product.

5. The method of claim 4 wherein the determined one or more search criteria is selected based on at least address information contained in the customer account.

6. The method of claim 5 wherein the content image contains schedule information for activities in the geographical area of the address contained in the customer account.

7. The method of claim 6 wherein the content image is selected further based on at least the time of year when the second customized product is being created such that the schedule information selected is timely.

8. The method of claim 1 wherein a default content image is selected for insertion into the second content area if the determined one or more search criteria is not associated with any of the plurality of content images.

9. The method of claim 1 wherein at least some content of the first customized product design is identified as being associated with particular subject matter and wherein the content image selected for insertion into the second content area is selected based on that subject matter.

10. The method of claim 1 wherein the second customized product design is created and presented in response to a request from the customer for the automatic creation of at least one additional product design.

11. The method of claim 1 wherein the second customized product design is created and presented without request by the customer.

12. The method of claim 1 further comprising sending an email to the customer containing an image of the second customized product design.

13. The method of claim 12 wherein the email contains a link configured to allow the customer initiate a process for purchasing products having the second customized product design.

14. The method of claim 13 wherein the email contains a link allowing the customer to initiate a process for editing the second customized product design prior to initiating the purchasing process.

15. The method of claim 1 further comprising displaying an image of the second customized product design to the customer on a Web page.

16. The method of claim 15 wherein the Web page displays a link allowing the customer to initiate a process for purchasing products having the second customized product design.

17. The method of claim 16 wherein the Web page displays a link allowing the customer to initiate a process for editing the second customized product design.

18. The method of claim 1 wherein the determined one or more search criteria comprises a customer's occupation.

19. The method of claim 1 wherein the determined one or more search criteria comprises a customer's geographical location.

20. The method of claim 1 wherein the content image selected for insertion into the second content area is further selected based on a time of year.

21. Computer readable storage media comprising one or more computer readable storage mediums, the computer readable storage media tangibly embodying program instructions which, when executed by a computer system comprising one or more computers, implement a method for automatically creating a design for a second customized product for a customer, the second customized product design being related to an earlier-created design of a first customized product associated with the customer, the method comprising:

retaining the first customized product design and a customer account containing customer information and product information associated with the first customized product design in electronic form;

retaining a plurality of content images in electronic form, one or more of which are associated with one or more search criteria;

retaining an uncustomized design for a second product in electronic form, the uncustomized design having at least a first content area for content retrieved from the first customized product design and a second content area for an image retrieved from the plurality of content images retained in electronic form;

automatically retrieving information from the first customized product design and inserting the retrieved information into the first content area;

analyzing by the computer system the customer account information associated with the first customized product design to determine one or more search criteria for selecting a content image from the plurality of content images; and automatically selecting a content image from the plurality of content images based on the determined one or more search criteria and inserting the selected content image into the second content area such that a second product design customized for the customer is automatically created without requiring the customer to design the second product design.

22. The computer readable storage media of claim 21 wherein the retrieved information inserted into the first content area is an image of the first customized product.

23. The computer readable storage media of claim 21 wherein the retrieved information inserted into the first content area is information taken from the design of the first customized product.

24. The computer readable storage media of claim 21 wherein the determined one or more search criteria is extracted from information contained in the customer account information associated with the first customized product.

25. The computer readable storage media of claim 24 wherein the determined one or more search criteria is selected based on at least address information contained in the customer account.

26. The computer readable storage media of claim 25 wherein the content image contains schedule information for activities in the geographical area of the address contained in the customer account.

27. The computer readable storage media of claim 26 wherein the content image is selected further based on at least the time of year when the second customized product is being created such that the schedule information selected is timely.

28. The computer readable storage media of claim 21 wherein a default content image is selected for insertion into the second content area if the determined one or more search criteria is not associated with any of the plurality of content images.

29. The computer readable storage media of claim 21 wherein at least some content of the first customized product design is identified as being associated with particular subject matter and wherein the content image selected for insertion into the second content area is selected based on that subject matter.

30. The computer readable storage media of claim 21 wherein the second customized product design is created and presented in response to a request from the customer for the automatic creation of at least one additional product design.

31. The computer readable storage media of claim 21 wherein the second customized product design is created and presented without request by the customer.

32. The computer readable storage media of claim 21, the method further comprising sending an email to the customer containing an image of the second customized product design.

33. The computer readable storage media of claim 32 wherein the email contains a link configured to allow the customer initiate a process for purchasing products having the second customized product design.

34. The computer readable storage media of claim 33 wherein the email contains a link allowing the customer to initiate a process for editing the second customized product design prior to initiating the purchasing process.

35. The computer readable storage media of claim 21, the method further comprising displaying an image of the second customized product design to the customer on a Web page.

36. The computer readable storage media of claim 35 wherein the Web page displays a link allowing the customer to initiate a process for purchasing products having the second customized product design.

37. The computer readable storage media of claim 36 wherein the Web page displays a link allowing the customer to initiate a process for editing the second customized product design.

38. The computer readable storage media of claim 21 wherein the determined one or more search criteria comprises a customer's occupation.

39. The computer readable storage media of claim 21 wherein the determined one or more search criteria comprises a customer's geographical location.

40. The computer readable storage media of claim 21 wherein the content image selected for insertion into the second content area is further selected based on a time of year.

41. A system which automatically creates a design for a second customized product for a customer, the second customized product design being related to an earlier-created design of a first customized product associated with the customer, the system comprising:

one or more computer data storage systems configured to retain computer-readable data, including the first customized product design, a customer account associated with the customer and the first customized product design and containing customer information, product information associated with the first customized product design, a plurality of content images one or more of which are associated with one or more search criteria, and an uncustomized design for a second product the uncustomized design having at least a first content area configured to receive content retrieved from the first customized product design and a second content area configured to receive an image retrieved from the plurality of content images; and one or more computers configured to automatically retrieve information from the first customized product design and insert the retrieved information into the first content area, analyze the customer account information associated with the first customized product design to determine one or more search criteria for selecting a content image from the plurality of content images, and automatically select a content image from the plurality of content images based on the determined one or more search criteria and insert the selected content image into the second content area such that a second product design customized for the customer is automatically created without requiring the customer to design the second product design.

42. The system of claim 41 wherein the retrieved information inserted into the first content area is an image of the first customized product.

43. The system of claim 41 wherein the retrieved information inserted into the first content area is information taken from the design of the first customized product.

44. The system of claim 41 wherein the determined one or more search criteria is extracted from information contained in the customer account information associated with the first customized product.

45. The system of claim 44 wherein the determined one or more search criteria is selected based on at least address information contained in the customer account.

46. The system of claim 45 wherein the content image contains schedule information for activities in the geographical area of the address contained in the customer account.

47. The system of claim 46 wherein the content image is selected further based on at least the time of year when the second customized product is being created such that the schedule information selected is timely.

48. The system of claim 41 wherein a default content image is selected for insertion into the second content area if the determined one or more search criteria is not associated with any of the plurality of content images.

49. The system of claim 41 wherein at least some content of the first customized product design is identified as being associated with particular subject matter and wherein the content image selected for insertion into the second content area is selected based on that subject matter.

50. The system of claim 41 wherein the second customized product design is created and presented in response to a request from the customer for the automatic creation of at least one additional product design.

51. The system of claim 41 wherein the second customized product design is created and presented without request by the customer.

52. The system of claim 41, said one or more computers further configured to send an email to the customer containing an image of the second customized product design.

53. The system of claim 52 wherein the email contains a link configured to allow the customer initiate a process for purchasing products having the second customized product design.

54. The system of claim 53 wherein the email contains a link allowing the customer to initiate a process for editing the second customized product design prior to initiating the purchasing process.

55. The system of claim 41, said one or more computers further configured to display an image of the second customized product design to the customer on a Web page.

56. The system of claim 55 wherein the Web page displays a link allowing the customer to initiate a process for purchasing products having the second customized product design.

57. The system of claim 56 wherein the Web page displays a link allowing the customer to initiate a process for editing the second customized product design.

58. The system of claim 41 wherein the determined one or more search criteria comprises a customer's occupation.

59. The system of claim 41 wherein the determined one or more search criteria comprises a customer's geographical location.

* * * * *